(12) United States Patent
Dhalla et al.

(10) Patent No.: US 7,848,998 B1
(45) Date of Patent: Dec. 7, 2010

(54) CONVERTIBLE HYBRID SECURITIES

(75) Inventors: Rizvan Dhalla, New York, NY (US);
Serkan Savasoglu, New York, NY (US);
Scott Greenberg, New York, NY (US);
Jonathan Ross, Eastchester, NY (US);
Jeffer M. Choudhry, New York, NY (US)

(73) Assignee: Morgan Stanley, New York, NY (US)

( * ) Notice: Subject to any disclaimer, the term of this patent is extended or adjusted under 35 U.S.C. 154(b) by 419 days.

(21) Appl. No.: 11/827,831

(22) Filed: Jul. 13, 2007

(51) Int. Cl.
*G06Q 40/00* (2006.01)
(52) U.S. Cl. .................. 705/37; 705/35; 705/36 R
(58) Field of Classification Search .............. 705/35–40
See application file for complete search history.

(56) References Cited

U.S. PATENT DOCUMENTS

| 7,222,094 B2 * | 5/2007 | Ross .................. 705/36 R |
| 2002/0049665 A1 * | 4/2002 | Solomon et al. .............. 705/37 |
| 2003/0163400 A1 * | 8/2003 | Ross et al. .................... 705/35 |
| 2003/0163401 A1 * | 8/2003 | Dines et al. ................... 705/35 |
| 2004/0181475 A1 * | 9/2004 | Haroon ........................ 705/35 |
| 2005/0160025 A1 * | 7/2005 | Birle et al. .................... 705/37 |

OTHER PUBLICATIONS

A Risk-Reducing Signalling Mechanism Author(s): Edward Henry Robbins and John D. Schatzberg Source: The Journal of Finance, vol. 41, No. 4 (Sep. 1986), pp. 935-949.*
Brooks, Robert, & Attinger, Bill. (1992). Using Duration and Convexity in the Analysis of Callable Convertible Bonds. Financial Analysts Journal, 48(4), 74. Retrieved Aug. 2, 2010, from ABI/INFORM Global. (Document ID: 456886).*

\* cited by examiner

*Primary Examiner*—Alexander Kalinowski
*Assistant Examiner*—Abhishek Vyas
(74) *Attorney, Agent, or Firm*—K&L Gates LLP

(57) ABSTRACT

The present invention is directed to a method comprising the step of issuing one or more convertible hybrid securities by an issuer to one or more investors. The issued hybrid securities may have (1) a legally enforceable covenant (e.g., an RCC) and (2) a mandatory deferral which may require the issuer to withhold certain payments upon an occurrence of specified events. The hybrid securities may be convertible by the investor or callable by the issuer. Upon conversion by an investor, the issuer may make a payment to the investor in an amount of preferred stock up to the par value of the hybrid securities and an amount of common stock for the amount paid over the par value of the hybrid securities. The preferred stock may comprise a dividend rate. The dividend rate may be (1-statutory tax rate) times a coupon for the hybrid securities. The issuer may settle with the investor, or all of the investors, upon the issuer calling the hybrid securities.

26 Claims, 2 Drawing Sheets

CONVERTIBLE HYBRID SECURITIES

BACKGROUND

Firms traditionally have issued conventional securities such as straight debt and common stock in order to raise capital. In general, straight debt securities (e.g., bonds, notes, loans, mortgages) raise capital by borrowing and promising to repay a principal amount and interest on a specified future date. Common stock securities, on the other hand, raise capital by selling an equity interest in the firm.

In addition to conventional types of securities, firms also have a variety of more sophisticated investment instruments at their disposal. These hybrid securities often combine attributes of several different types of securities (e.g., debt components and equity components) and may change optionally or automatically at certain points in time or depending on market conditions. Convertible securities, such as convertible debt, for instance, provide the issuer and/or the holder with the option of exchanging the convertible securities for other securities, such as common stock. Convertible securities may be priced at a premium, yet may be attractive to investors due to their mix of features, such as earning interest like bonds when the stock price is down or flat and increasing in value like common stock when the stock price rises.

New forms of hybrid capital instruments include instruments that are structured as debt for all purposes (e.g., tax, GAAP), yet receive some measure of equity credit from various credit rating agencies (in particular, Standard & Poors Ratings Services, Moody's Investors Service and Fitch Ratings). While a number of different structural features can be included in these hybrid securities to achieve differing levels of equity credit, there are some core features that are common to all of these hybrid securities. These common features include deep subordination, long-dated maturities (e.g., 60-year legal maturity) and the ability to defer coupon payments on the hybrid security (e.g., 10 years of optional deferral).

Generally, these hybrid securities are callable by the issuer prior to their legal maturity. If a hybrid security is callable, the issuer of the hybrid security has the right, but not the obligation, to repurchase the hybrid security at a specified price at some point in the future. These hybrid securities may also be convertible by the investor of the hybrid securities prior to their legal maturity. If a hybrid security is convertible, the investor also has the right, but not the obligation, to convert the hybrid securities to some other security or cash at a specified price at some point in the future.

One type of hybrid security is one that has a so-called "replacement capital covenant" ("RCC"). An RCC is a legally enforceable covenant entered into by the issuer of the hybrid securities to issue additional securities to replace the hybrid securities at some point in time, such as a number of years after the issuance of the hybrid securities, if the hybrid securities have been called by the issuer. Again, an RCC can typically be found in the prospectus, offering memorandum, indenture or a similar document for the issued hybrid security.

A different type of hybrid security is a hybrid security with a so-called "replacement capital intention" ("RCI"). An RCI is a stated intention by the issuer of the hybrid securities to issue additional securities to replace the issued hybrid securities if the hybrid securities have been called by the issuer. Such an RCI is typically not legally enforceable and can usually be found in the prospectus, offering memorandum, indenture or a similar document for the issued hybrid security.

To satisfy the RCC, the issuer must issue replacement securities before calling the hybrid securities, where the replacement securities give the issuer the same amount of equity credit as contained in the called hybrid securities. The issuance of the replacement securities must occur during a specified period of time prior to calling the hybrid securities, typically 180 days, in order to satisfy the RCC. For hybrid securities that include an RCI instead of an RCC, the RCI may also have a requirement that replacement securities must be issued prior to the calling of the hybrid securities, but any requirements found under the RCI are typically less formal than those found under an RCC because only the RCC is legally enforceable. If the issuer calls the hybrid securities without issuing the replacement securities prior to calling the hybrid securities, the issuer has breached the RCC or the RCI, as the case may be, depending on which clause the hybrid security contains. A breach of the RCI may negatively affect the issuer's credit rating, although, as mentioned above, it is not ordinarily legally enforceable. A breach of an RCC, in addition to negatively affecting the issuer's credit raring, may be legally enforceable.

Often these callable hybrid securities will also have no-call periods. A non-call period is a time period where the issuer is prohibited from calling the hybrid security. Often the non-call period is at the beginning of the term of the hybrid security. For example, for a sixty year term hybrid security, a non-call period may extend from the issue date of the hybrid security to some point in time in the future, such as five or ten years after the issue date.

In addition, hybrid securities are often deeply subordinated. Because hybrid securities often combine attributes of debt and equity, their treatment, for subordination purposes, also takes into account the subordination features of debt and equity. For example, these hybrid securities are often junior to every piece of outstanding debt the issuer has but would be senior to the equity shareholders.

SUMMARY OF THE INVENTION

In one general aspect, the present invention concerns convertible hybrid securities that are issued by an issuer. The hybrid securities may have both: (1) a legally enforceable covenant (e.g., an RCC) which may require the issuer to issue replacement securities if the hybrid securities are called by the issuer after a scheduled maturity date of the hybrid securities (assuming they have not been called prior to the scheduled maturity date); and (2) a mandatory deferral which may require the issuer to withhold certain payments on the securities upon an occurrence of specified events. The specified events may include: (1) the issuer's leverage ratio being equal to or greater than some threshold level (such as 6× for each of the three most recent completed quarters); and (2) the issuer's interest coverage ratio being less than or equal to some threshold level (such as 2× for each of the three most recent completed quarters). According to various embodiments, the present invention is directed to issuing, purchasing, offering for sale, and/or underwriting the issuance of, the securities.

The conversion price of the securities may be a premium over the issue price, such as 140% of the price at issuance. During various periods of the term of the securities, the securities may be freely convertible by the investor, contingently convertible, or not convertible. During the contingent convertible time period, the investor may be restricted from converting the hybrid securities unless the price of the securities into which the convertible hybrid is convertible is greater than a first specified price, such as 140% of the conversion price. Upon conversion by the investor, the issuer may pay the investor preferred stock in an amount to the par value of the hybrid securities and an amount of common stock for the amount paid over the par value of the hybrid securities. The preferred stock may have a dividend rate that is (1-statutory tax rate) times a coupon for the hybrid securities.

Also, during various time periods of the term of the securities, the issuer may be (i) freely able to call the securities, (ii) contingently able to call the securities, or (iii) prohibited from calling the securities. The freely-callable period may be at the end of the term of the securities. The non-call period, during which the issuer is prohibited from calling the hybrid securities, may occur at the beginning of the term. During the contingent call period, which may be between the non-call and the freely-callable periods, the issuer may only be able to call the securities if the price of the securities into which the convertible hybrid is convertible is above some threshold price, such as 130% of the conversion price. During certain time periods, when the issuer calls the securities, the issuer may be required to pay cash up to the par value of the called securities and common stock for the "in-the-money" amount. During other time periods, the issuer may only be required to pay cash for the called securities.

FIGURES

Embodiments of the present invention will be described by way of example in conjunction with the following figures, wherein.

DETAILED DESCRIPTION OF THE INVENTION

Figure 1:
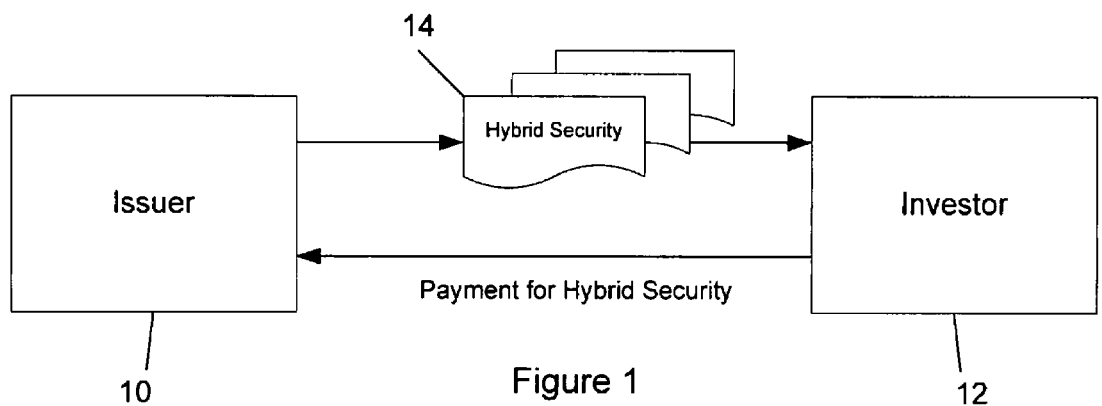
FIG. 1 illustrates a process involving the issuance of convertible hybrid securities to one or more investors according to one embodiment of the present invention.

FIG. 1 illustrates a process according to various embodiments of the present invention. As shown in FIG. 1, an issuer 10 issues one or more convertible hybrid securities 14 to one or more investors 12. The investor(s) 12 may purchase one or more of the convertible hybrid securities 14 issued by the issuer 10 as part of the initial offering by the issuer 10, and may resell them in a secondary market as described further below. The issuer, and/or its agent, may use a computer system, comprising a processor, a database and a computer readable medium, to record and track ownership of the hybrid securities 14.

The hybrid securities 14 may lie somewhere along the debt-equity continuum, having characteristics of both debt and equity. For example, according to various embodiments, the hybrid securities 14 may be classified as Basket D hybrid securities in which the equity portion of the hybrid security is 75% and the debt portion of the hybrid security is 25%, or they could be considered Basket C hybrid securities in which the equity portion of the hybrid security is 50% and the debt portion of the hybrid security is 50%. In other embodiments, different proportions of debt to equity could be used. Issuers (such as issuer 10) often like hybrid securities because these instruments often receive favorable treatment by rating agencies and regulators when they analyze an issuer's capital structure, and they may also provide a lower after-tax cost of capital for issuers.

The issuer 10 may be any entity legally authorized to issue such hybrid securities 14. For example, the issuer 10 could be an insurance company, a financial institution or a corporation.

Figure 2:
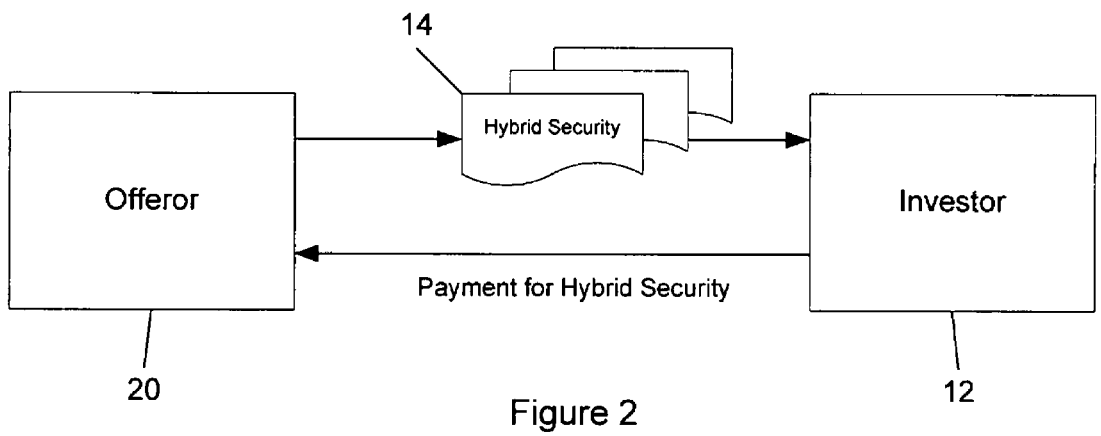
FIG. 2 illustrates the offering of convertible hybrid securities to an investor in a secondary market for convertible hybrid securities according to one embodiment of the present invention.

In various other embodiments, a secondary market may exist for the hybrid securities 14. As shown in FIG. 2, an offerer 20 may offer for sale one or more of the hybrid securities 14 issued by an issuer 10 in a secondary market for the hybrid securities 14. For example, the offerer 20 may have been an investor 12 in an earlier transaction to acquire the hybrid securities 14 only later to offer the hybrid securities 14 for sale to another investor 12 in the secondary market. An investor 12 may purchase one or more of the hybrid securities 14 issued by an issuer 10 from the offerer 20 in the secondary market. The computer system may also be used to record and track ownership of the hybrid securities 14 in the secondary market.

In another general embodiment, an underwriter (not shown) may underwrite the issuance of the hybrid securities 14 by the issuer 10. The underwriter may purchase all of the hybrid securities 14 from the issuer 10 and offer them for sale to investors 12 using book-building techniques, for example. The underwriter may also employ a computer system, comprising a processor, a database and a computer-readable medium, to assist in the underwriter's bookmaking techniques.

Figure 3:
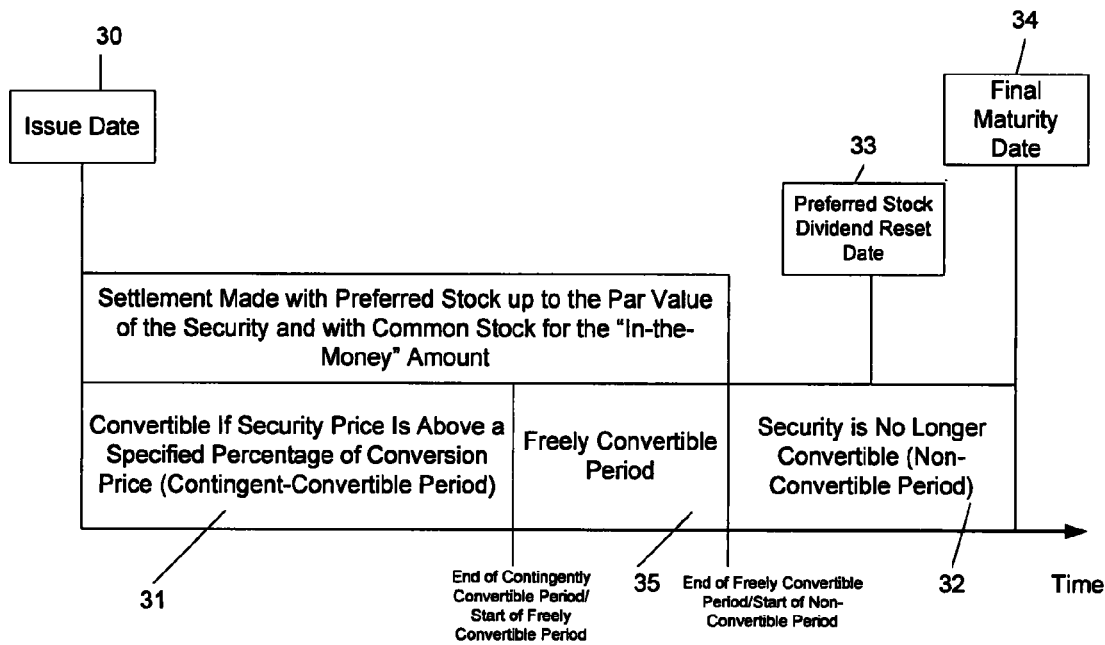
FIG. 3 is a timeline illustrating the timing, with regards to the investor, of one embodiment of the present invention.

As shown in FIG. 3, the hybrid securities may have an issue date 30 and a final maturity date 34. The hybrid securities 14 may be issued on the issue date 30 and may mature on the final maturity date 34. The time period between the issue date 30 and the final maturity date 34 corresponds to the term of the hybrid securities 14, which may be, for example, fifty to sixty years.

The hybrid securities 14 may have a conversion price. The conversion price may be some premium over the price at issuance of the securities into which the convertible hybrid is convertible, such as 140% of the price at issuance. For example, if the securities into which the convertible hybrid is convertible are priced at $45 at issuance, the conversion price of the hybrid securities may be $63, or $45×1.4. The conversion price may be calculated by the computer system.

The hybrid securities 14 may be convertible during certain periods of the securities' term by any of the investors 12. For example, the hybrid securities 14 may be freely convertible during certain periods and there may be restrictions on conversion during other periods. In one embodiment of the present invention, the investor 12 may be restricted from converting the hybrid securities 14 in a contingent-convertible time period 31 (see FIG. 3) if the price of the hybrid securities is less than a first specified price. This first specified price may be some percentage (e.g., 140%) of the conversion price. For example, where the issued price is $45 and the conversion price is $63, the price of the securities into which the convertible hybrid is convertible may have to be $88, or $63×1.4, for the investor 12 to be able to convert the hybrid securities 14 in the contingent-convertible time period 31. According to various embodiments, the investor 12 may be allowed to convert the hybrid securities during the contingent-convertible time period 31 if the price of the securities into which the convertible hybrid is convertible has been greater than the first specified price for a specified number of days over a specified time period, for example, twenty out of thirty days. The contingent-convertible time period 31 may comprise a time period occurring after the issue date 30 and prior to a specified date. The contingent-convertible time period 31 may end, for example, thirty years after the issue date. That is, the investor may be able to convert the securities 14 in the first thirty years after issuance if the price of the securities into which the convertible hybrid is convertible is greater than 140% of the conversion price. The computer system may be used to track the dates along with the pricing involved at each date and calculate whether all of the requirements have been met for the investor 12 to convert the hybrid securities.

The investor 12 may also be completely restricted from converting the hybrid securities during a non-convertible time period 32. The non-convertible time period 32 may comprise a time period occurring at the end of the term of the securities 14. For example, the non-convertible time period 32 may commence thirty-five years after the issue date and last until the final maturity date. So if the term of the securities is sixty years, the non-convertible period 32 may be the twenty-five years at the end of the term.

The investor 12 may also be entitled to freely convert the hybrid securities during a freely convertible time period 35. The freely convertible time period 35 may comprise a time period occurring at the end of the contingent-convertible time period 31 and prior to the non-convertible time period 32. For example, the freely convertible time period 35 may commence thirty years after the issue date 30 and end thirty-five years after the issue date 30.

In one embodiment, the issuer 10 may be required to settle with an investor 12, upon the investor 12 converting the hybrid securities 14 during either of the time periods 31, 35. Upon conversion, the issuer 10 may make a payment to the investor 12 in an amount of preferred stock up to the par value of the hybrid securities 14 and an amount of common stock of the issuer 10 for the amount paid by the issuer 10 over the par value of the hybrid securities 14. The preferred stock may pay a dividend rate. The dividend rate may be, for example, (1-statutory tax rate of the issuer) times the coupon of the hybrid securities 14. For example, if the issuer's tax rate is 35%, the dividend rate for the preferred stock may be 65% times the coupon of the convertible hybrid securities 14.

Such convertible hybrid securities may be attractive to an issuer because rating agencies are likely to give partial equity credit to the issued securities, meaning that only a portion of the offering needs to be listed as debt on the issuer's balance sheet. Further, such convertible hybrid securities may be attractive to investors because the securities pay a predictable rate of return until a certain date, at which point the investor has the option of converting the securities into the underlying equity shares.

The investor 12 may be required to redeem the preferred stock when the remainder of the hybrid securities have been redeemed by the issuer 10, as described further below. The hybrid securities may be redeemed by the issuer calling the hybrid securities at any point in time prior to the final maturity date or automatically at the final maturity date. The dividend rate of the preferred stock may be reset at a future date, or the preferred stock dividend reset date 33. The preferred stock dividend reset date 33 may occur, for example, forty years after the issue date 30. The dividends due to be paid on the preferred stock may be calculated and stored by the computer system.

Figure 4:
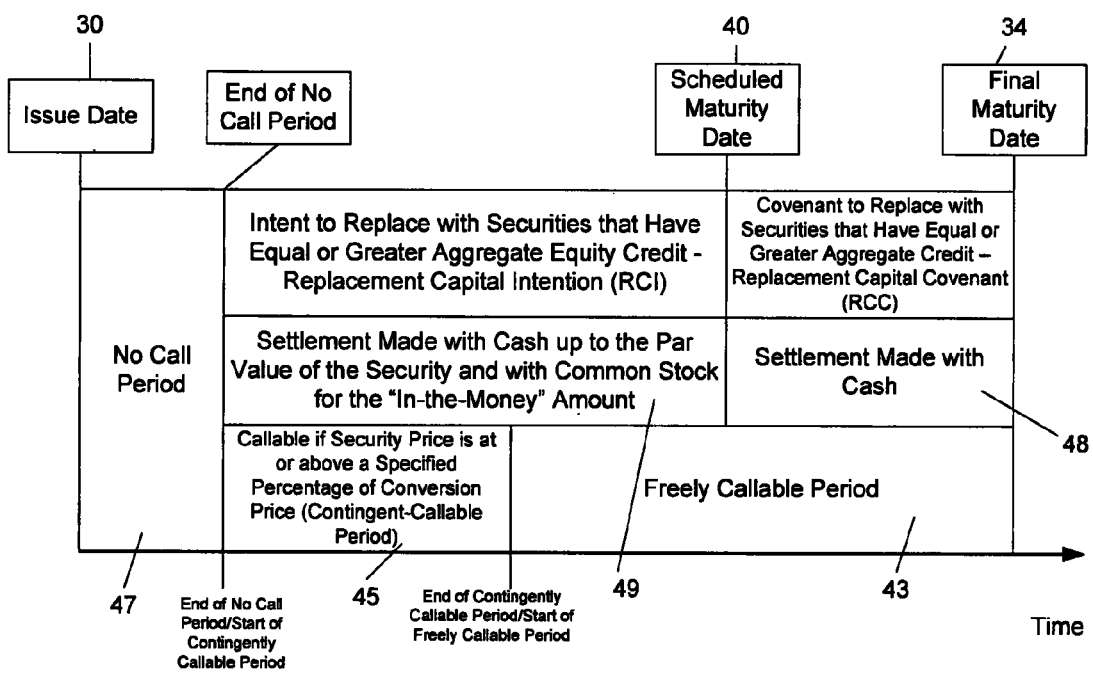
FIG. 4 is a timeline illustrating the timing, with regards to the issuer, of one embodiment of the present invention.

As shown in FIG. 4, the hybrid securities 14 may also have a scheduled maturity date 40. The scheduled maturity date 40 may occur after the issue date 30 but prior to the final maturity date 34 of the hybrid securities. The scheduled maturity date 40 may be, for example, thirty to thirty-five years after the issue date 30. During certain time periods over the term, the issuer 10 may be able to freely call the hybrid securities 14 for a call price, and during other time periods, the issuer 10 may be restricted from calling the hybrid securities 14, either partially or completely.

In various embodiments, the hybrid securities 14 may have a non-call period 47 during which the issuer 10 is prohibited from calling the hybrid securities 14. The non-call period 47 may be a time period occurring immediately after the issue date 30 and ending prior to the final maturity date 34. The non-call period 47, as shown in FIG. 4, may be at the beginning of the term of the hybrid securities 14 and extend from the issue date 30 to some point in time in the future, such as five or ten years after the issue date 30.

The issuer 10 may be restricted from calling the hybrid securities 14 during a contingent-call time period 45 if the price of the hybrid securities 14 is less than a second specified price. For example, the issuer 10 may only be able to call the securities 14 during the contingent-call time period 45 if the price of the securities into which the convertible hybrid is convertible is greater than the second specified price. The second specified price may be some percentage (e.g., 130%) of the conversion price. For example, if the issue price is $45 and the conversion price is $63, the second specified price may be $82, or $63×1.3. That way, during the contingent-call time period, the issuer 10 may only be able to call the securities 14 if the price of the securities into which the convertible hybrid is convertible is greater than $82. Whether the price is considered greater than the second specified price may be determined based on whether the price has been greater than the second price for a specified number of days over a specified time period, for example, twenty out of thirty days. The contingent-call period 45 may comprise a time period which occurs after the issue date 30 and prior to the final maturity date 34. In one embodiment, as shown in FIG. 4, the contingent-call period may occur immediately after the non-call period 47 and may last for twenty-five years.

The issuer 10 may also be entitled to freely call the hybrid securities during a freely callable time period 43. The freely callable time period 43 may comprise a time period occurring at the end of the contingent-callable time period 45. For example, the freely callable time period 43 may commence thirty years after the issue date 30 and last until the final maturity date 34.

In various embodiments, the issuer 10 may settle with the investor 12, or all of the investors, upon the issuer 10 calling the hybrid securities 14. In one embodiment, the issuer 10 may make a payment of cash to the investor 12 to settle the hybrid securities 14 if the securities are called during a time period 48. The time period 48 may last from the scheduled maturity date to the final maturity date.

Also, the issuer 10 may be restricted to paying the investor 12 cash up to the par value of the called securities and in common stock for the amount of the call price paid by the issuer 10 over the par value of the hybrid security 14 if the securities are called during a time period 49 shown in FIG. 4. The time period 49 may be a time period which occurs after the non-call period 47 and prior to the scheduled maturity date 40. For example, as shown in FIG. 4, the time period 49 may commence five years after the issue date 30 and last until thirty-five years after the issue date 30. Upon the issuer calling the hybrid securities, the issuer may also settle with the investors who have converted the hybrid securities into preferred stock. The issuer may settle the preferred stock in the same manner as the issuer may have settled the hybrid securities.

In one general embodiment, the hybrid securities 14 may have a stated intention by the issuer 10 to issue replacement securities if the hybrid securities 14 are called by the issuer 10 prior to the scheduled maturity date 40 of the hybrid securities 14. This stated intention may be, in such an embodiment, a replacement capital intention (RCI). The stated intention may be breached if the issuer 10 does not issue replacement securities for the hybrid securities 14 having equal or greater equity content to the hybrid securities 14 prior to calling the hybrid securities 14 prior to the scheduled maturity date 40. To determine whether the stated intention is satisfied, a look-back time period prior to the calling of the hybrid securities 14 may be examined to see if the issuer 10 issued the replacement securities during the look-back time period. In a preferred embodiment, the RCI look-back time period may be 180 days prior to the calling of the hybrid securities 14 pursuant to the RCI, for example. If a breach of the stated intention occurs, such breach may have a negative impact on the credit rating of the issuer 10, but may not be legally enforceable. The preferred stock may also be subject to the replacement capital intention in the same manner as the hybrid securities.

The hybrid securities 14 may also have an enforceable covenant which may require the issuer 10 to issue replacement securities if the hybrid securities 14 are called by the issuer 10 after the scheduled maturity date 40 of the hybrid securities 14 (assuming they have not been called prior to the scheduled maturity date 40) and prior to the final maturity date 40. For example, the issuer 10 may be required to issue replacement securities if the hybrid securities are called by the issuer 10 after the scheduled maturity date 40 which may occur, for example, a number of years after the issue date 30 (e.g., thirty, thirty-five or fifty years after the issue date). The enforceable covenant may be, in such an embodiment, a replacement capital covenant (RCC), which may be breached if the issuer 10 does not issue replacement securities having equal or greater equity content in a time period prior to the issuer 10 calling the hybrid securities 14 after the scheduled maturity date 40. The issuer 10 may be required to use commercially reasonable efforts to sell securities, such as common stock, mandatory convertible securities, or other qualifying capital securities, which may fund the redemption of the hybrid securities. A RCC look-back period (e.g., 180 days) may be examined to see if the issuer 10 issued the replacement securities during the look-back period to determine if the RCC has been breached or not. If a breach of the enforceable covenant occurs, such breach may have a negative impact on the credit rating of the issuer 10 and may be legally enforceable.

In summary, therefore, according to one general embodiment of the present invention, the hybrid securities 14 may have an RCI from the issue date 30 or some time thereafter (such as after the no-call period) up to the scheduled maturity date 40. After the scheduled maturity date 40, the hybrid securities 14 are subject to an RCC (assuming they have not been called prior to the scheduled maturity date 40). Thus, if the hybrid securities 14 are called prior to the scheduled maturity date 40, they are subject to the RCI, and if they are called between the scheduled maturity date 40 and the final maturity date 40, they are subject to the RCC.

In various embodiments, the issuer 10 may be required to withhold interest payments from the investors 12 of the hybrid securities 14 upon the occurrence of specified conditions during the term of the securities 14 based upon a mandatory deferral. In one embodiment, the specified conditions may include the issuer's leverage ratio being equal to or greater than 6× for each of the three most recently completed quarters. An additional or alternative condition that may activate the mandatory deferral is if the issuer's interest coverage ratio is equal to or less than 2× for each of the three most recently completed quarters.

The issuer's leverage ratio for any fiscal quarter may equal the issuer's adjusted debt at the end of that quarter divided by the sum of four times the issuer's adjusted earnings before interest, taxes, depreciation and amortization ("EBITDA") for that quarter and the issuer's annual rent expense. The issuer's interest coverage ratio for any fiscal quarter may equal the sum of four times the issuer's adjusted EBITDA for that quarter and one-third of the issuer's annual rent expense divided by the sum of four times the issuer's adjusted interest for that quarter and one-third of the issuer's annual rent expense. All of the numbers used to calculate the leverage ratio and the interest coverage ratio may be obtained from the issuer's financial statements. The issuer's leverage ratio and interest coverage ratio may be calculated using the computer system.

The issuer 10 may be required to sell warrants or preferred stock, which may be subject to certain caps, to make interest payments on the securities 14 to the investor 12. During the period of mandatory deferral, the issuer 10 may be restricted from paying common stock dividends. Also, during this period of mandatory deferral, the issuer 10 may be restricted from repurchasing shares.

In various embodiments, the issuer 10 may have the option of deferring interest payments to be made to the investor 12 during an optional interest deferral period. The optional interest deferral period may be a time period equal to ten years, which may or may not be consecutive years. At any point in time during the optional interest deferral period, the issuer 10 may choose to begin to make the interest payments to the investors 12. The issuer 10 may be required to sell warrants or preferred stock, which may be subject to certain caps, to make interest payments to the investor 12 after a specified amount of time. This specified amount of time may be five years, which may or may not be consecutive years.

In various embodiments, the investor 12 may be compensated for losses when the issuer 10 is subject to a takeover by a third party. For example, during a takeover attempt, the value of the hybrid securities 14 may significantly under perform the issuer's equity securities. Upon a cash takeover, the investors 12 may only realize the par amount of the hybrid securities 14 by putting the hybrid securities 14 back to the issuer 10 or the parity value of the securities underlying the hybrid securities 14 by converting the hybrid securities 14. The difference between the greater of the par value or parity value of the hybrid securities 14 and the true value of the hybrid securities 14 may be considered a loss for the investor 12. The investor 12 may be compensated for this loss through the use of a make-whole feature of the hybrid securities 14.

If substantially all assets of the company are sold, the investors 12 may convert the hybrid securities 14 and receive the parity value of the securities underlying the hybrid securities 14 or require the issuer 10 to repurchase the hybrid securities and pay the investor 12 a value equal to par.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A computer-implemented method relating to convertible hybrid securities issued by an issuer to one or more investors, wherein each hybrid security is convertible under certain conditions into a security, and wherein each hybrid security has an issue date, a scheduled maturity date, a conversion price, and a final maturity date, the method comprising:

determining, by a computer system, the issuer's leverage ratio and the issuer's interest coverage ratio, wherein the computer system comprises a processor and a database, and wherein the issuer is obligated pursuant to the hybrid securities to make payments on the hybrid securities to holders thereof when the issuer's leverage ratio is less than a threshold leverage ratio and the issuer's interest coverage ratio is greater than a threshold interest coverage ratio;

tracking, by the computer system, ownership of the hybrid securities because the hybrid securities comprise an enforceable covenant requiring the issuer to issue replacement securities when the hybrid securities are called by the issuer after the scheduled maturity date of the hybrid securities; and determining, by the computer system, during a contingent convertible time period of the hybrid securities whether requirements for converting the hybrid securities are satisfied based on a current price of the security in which the hybrid securities are convertible and the conversion price of the hybrid securities, wherein the contingent convertible time period ends prior to a start of a freely convertible time period for the hybrid securities, wherein the investor is allowed to convert the hybrid securities in the contingent-convertible time period if the price of the securities into which the convertible hybrid are convertible has been greater than the first specified price for a specified number of days, and wherein the freely convertible time period ends prior to start of a non-convertible time period, and wherein the non-convertible time ends at the final maturity date, and wherein the issuer is required to settle with at least one holder of the hybrid securities, upon the at least one holder converting a quantity of the hybrid securities during either the contingent convertible time period or the freely time convertible period, for (i) an amount of preferred stock up to a par value of the hybrid securities and (ii) an amount of common stock of the issuer for an amount over the par value of the hybrid securities.

2. The method of claim 1, wherein the preferred stock pays a dividend rate that is (1-statutory tax rate of the issuer) times a coupon for the hybrid securities.

3. The method of claim 2, wherein the preferred stock must be redeemed when the hybrid securities are redeemed by the issuer.

4. The method of claim 2, wherein the dividend rate is reset at a preferred stock dividend reset date.

5. The method of claim 1, wherein the conversion price is a premium over the price at issuance of the securities into which the convertible hybrid is convertible.

6. The method of claim 5, wherein the premium is 140%.

7. The method of claim 5, wherein the hybrid securities are freely convertible by the investor during the freely convertible time period.

8. The method of claim 7, wherein the investor is restricted from converting the hybrid securities during the contingent-convertible time period if the price of the securities into which the convertible hybrid is convertible is less than a first specified price.

9. The method of claim 8, wherein the specified number of days is twenty of thirty days.

10. The method of claim 7, wherein the first specified price is 140% of the conversion price.

11. The method of claim 7, wherein the investor is restricted from converting the hybrid securities in the non-convertible time period.

12. The method of claim 11, wherein the issuer is entitled to call the hybrid securities for a call price during the freely callable time period.

13. The method of claim 12, wherein the hybrid securities further comprise a non-call period during which the issuer is prohibited from calling the hybrid securities, wherein the non-call period ends prior to the freely callable time period.

14. The method of claim 13, wherein the issuer is restricted from calling the hybrid securities during a contingent-call time period if the price of the securities into which the convertible hybrid is convertible is less than a second specified price.

15. The method of claim 13, wherein the issuer is entitled to call the hybrid securities during the convertible-call time period if the price of the security into which the hybrid securities are convertible has been greater than a second specified price for twenty of thirty days.

16. The method of claim 14, wherein the convertible-call time period occurs after the non-call period.

17. The method of claim 14, wherein the second specified price is 130% of the conversion price.

18. The method of claim 17, wherein the issuer is restricted to paying common stock to the investor for the amount of the parity value of the securities underlying the hybrid securities over the par value of the hybrid securities if the issuer calls the hybrid securities during a certain period of time.

19. The method of claim 18, wherein the certain period of time is a period that lasts from the end of the non-call period to the scheduled maturity date.

20. The method of claim 1, further comprising issuing, by the issuer pursuant to a stated intention, replacement securities when the hybrid securities are called by the issuer prior to the scheduled maturity date.

21. The method of claim 20, wherein the stated intention to issue replacement securities is a replacement capital intention that is breached if the issuer does not issue replacement securities for the hybrid securities if the hybrid securities are called prior to the scheduled maturity date.

22. The method of claim 21, wherein the preferred stock is subject to the replacement capital intention in the same manner as the hybrid securities.

23. The method of claim 1, wherein the enforceable covenant is a replacement capital covenant that is breached if the issuer does not issue the replacement securities in a RCC look-back time period prior to calling the hybrid securities after the scheduled maturity date.

24. The method of claim 23, wherein the RCC look-back time period is a time period occurring 180 days prior to the date the issuer calls the hybrid securities.

25. The method of claim 23, wherein the enforceable covenant is legally enforceable.

26. The method of claim 23, wherein the scheduled maturity date occurs after the issue date and prior to the maturity date of the hybrid securities.

* * * * *